No. 691,437. Patented Jan. 21, 1902.
R. J. BOGUE.
SPECIFIC GRAVITY SCALE.
(Application filed Feb. 27, 1901.)
(No Model.)

Witnesses
Inventor
Robert J. Bogue.

UNITED STATES PATENT OFFICE.

ROBERT JACKSON BOGUE, OF HONEYGROVE, TEXAS.

SPECIFIC-GRAVITY SCALE.

SPECIFICATION forming part of Letters Patent No. 691,437, dated January 21, 1902.

Application filed February 27, 1901. Serial No. 49,108. (No model.)

*To all whom it may concern:*

Be it known that I, ROBERT JACKSON BOGUE, a citizen of the United States, residing at Honeygrove, in the county of Fanning, State of Texas, have invented certain new and useful Improvements in Specific-Gravity Scales; and I do hereby declare the following to be a full, clear, and exact description of the invention, such as will enable others skilled in the art to which it appertains to make and use the same.

This invention relates to weighing-scales in general, and more particularly to that class designed for determining the specific gravity of any body, be it solid, liquid, or a gas, the object of the invention being to provide a construction wherein the difference in weight between the substance of which the specific gravity is to be determined and that of an equal volume of water may be found, so that the specific gravity of the substance may be determined.

Figure 1:
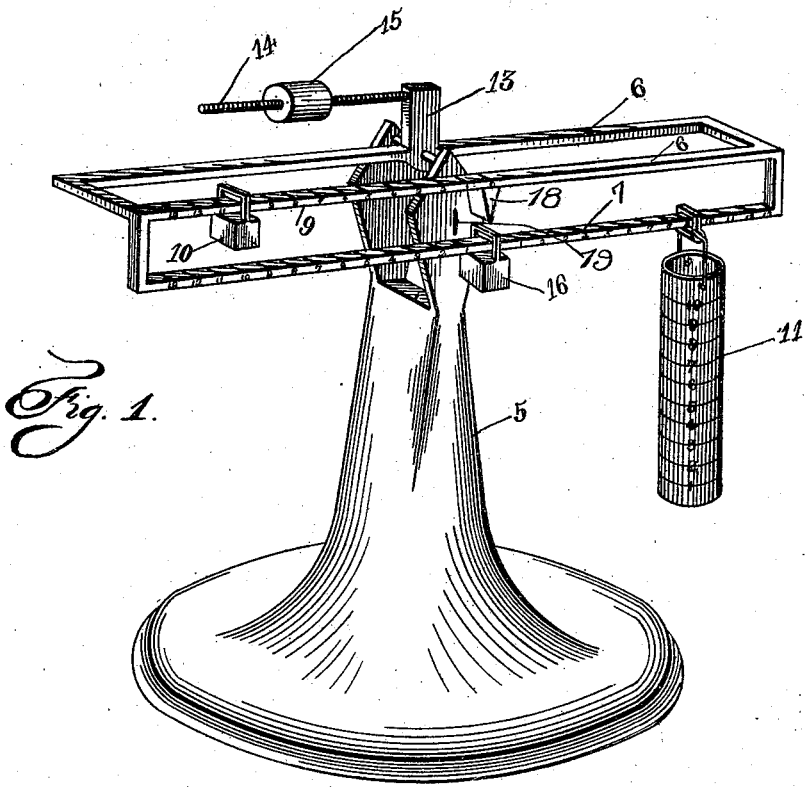
Figure 2:
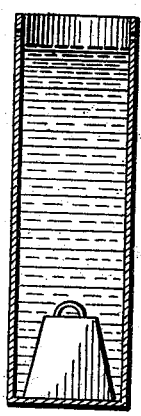

In the drawings forming a portion of this specification, and in which like numerals of reference indicate similar parts of both views, Figure 1 is an elevation showing the complete scale, as when indicating the specific gravity of a liquid. Fig. 2 is a side elevation showing the two receptacles, one having a solid and a liquid therein to fill it and the other containing a quantity of liquid equaling the bulk of the solid.

Referring now to the drawings, 5 represents a standard upon which is pivotally mounted a scale-beam, including an upper bar 6 and a lower bar 7, these two bars being connected at their ends to lie parallel. The beam is pivoted preferably midway of its ends, and the upper bar is provided with a scale 9, which runs from zero to any desired number of points, the zero-point being at the pivot of the beam or in vertical alinement therewith. A weight 10 is provided for this scale and has the usual sliding connection with the upper bar, so that it may be readily shifted from one point to another of the scale, this sliding connection having a knife-edge which directly engages the beam to suspend the weight. Attached to the lower bar of the scale-beam and at the opposite side of the pivot of the beam and in such manner as to prevent displacement thereof longitudinally of the beam is a receptacle 11, which, as shown, is adapted to receive a liquid or a solid to be weighed by the weight 10, and to counterbalance the dead-weight of this receptacle an upright 13 is projected from the upper bar 6 and has a laterally-extended and threaded arm 14, which projects in the direction of the weight 10 and is provided with a threaded counterbalance-weight 15, which may be rotated to adjust its position longitudinally of the arm, thus balancing the weight of the receptacle, as will be understood.

The principle on which this apparatus is operated is that the specific gravity may be determined by weighing the difference between the body to be determined and an equal bulk of water.

The receptacle 11 is graduated into tenths, and these graduations are numbered from "1" to "10." The scale 9 is also graduated from "1" to "10." It will be understood that the receptacle 11 is so positioned and the scale 9 is so graduated that when the receptacle is full of water it will be balanced by the weight 10 when the latter is at the outer end of the scale, or at the point marked "10." When the receptacle is empty, the weight 10 must be moved to zero, when the weight of the receptacle alone will be balanced by the counterbalancing-weight above referred to. If the receptacle be filled up to the point marked "5," then the weight 10 will balance it when moved to the point marked "5" on the scale. Supposing, then, that we place the weight 10 on the point "5" and we fill the receptacle 11 up to the graduation "5," if the liquid have the same specific gravity as water the scale-beam will balance, if it have less specific gravity than the water the receptacle will rise, and if it have greater specific gravity the receptacle will fall. Supposing, then, that the liquid being weighed has greater specific gravity than water and the receptacle drops, that weight added to the weight 10 that will balance the beam will indicate the difference between the weight of the liquid tested and the weight of an equal bulk of water. For thus balancing the beam the lower bar 7 is provided with two scales, a plus scale leading from the vertical plane of the pivot in the direction of the weight 10 and the other extending in the opposite direction, the former being a plus scale and the latter a minus scale. To bring the beam back to a balance, the weight 16 is moved upwardly of the plus scale and weighs the difference between the liquid in question and an equal bulk of water, thus permitting the specific gravity to be easily and accurately determined. The scale and the weight 16 being properly valued to give this result, the weight 16 is suspended by means of a hanger having a knife-edge that directly engages the beam.

When the specific gravity of a solid is to be secured, we must weigh the difference between the solid body and an equal bulk of water. For this purpose the two receptacles shown in Fig. 2 are used, one being the same as that used in the operation above described. These two receptacles are of equal capacities and are similarly graduated. The solid body is placed in one receptacle, and the other vessel is filled with water. Water is then poured from the second vessel or receptacle until the first one is filled, the water remaining in the second vessel being equal in bulk to the body to be determined. The weight 10 is then placed on its beam to correspond to the graduation at which the water stands in the second vessel to show the weight of an equal bulk of water. The water is then poured out of the first vessel, and this first vessel is hung on the scale-beam with the solid body in it. Weight 16 is then shifted to balance and indicates the difference between the weight of the body tested and an equal bulk of water. Of course if the specific gravity of the solid or liquid is less than "1" then the weight 16 falls, and to bring it up the weight 16 must be shifted out over the minus scale to bring the beam to a balance and will then show a specific gravity of less than "1."

For weighing gases a vessel of known capacity is used, and the weight 10 is set to balance an equal bulk of water. The receptacle is hung on the scale-beam, and the weight 16 is shifted on the negative scale to balance, thus indicating the specific gravity.

The beam has a pointer 18, which registers with a mark 19 on the standard when the beam is balanced.

What is claimed is—

A specific-gravity weighing apparatus comprising a pivoted beam, a receptacle for attachment to the beam and having graduations marked thereon, a scale on the beam corresponding to the graduations of the receptacle, a weight for the scale adapted to balance a body of water in the receptacle when placed on the point of its scale corresponding to the graduation at which the water stands in the receptacle, a counterbalance for the dead-weight of the receptacle, a second scale on the beam extending at both sides of the pivot of the beam, and a weight for the second scale adapted to balance the difference between the weight of a body contained in the receptacle and an equal bulk of water as indicated by the position of the first weight.

In testimony whereof I hereunto sign my name, in the presence of two subscribing witnesses.

ROBERT JACKSON BOGUE.

Witnesses:
W. T. CHRISTIAN,
F. W. HILL.